(12) United States Patent
Cheng et al.

(10) Patent No.: US 9,164,282 B2
(45) Date of Patent: Oct. 20, 2015

(54) IMAGE-PARTITIONED DISPLAY DEVICE FOR VIRTUAL IMAGE

(71) Applicant: Automotive Research & Test Center, Lugang, Changhua County (TW)

(72) Inventors: Shun-Wen Cheng, Lugang (TW); Chih-Bin Chiang, Lugang (TW); Jih-Tao Hsu, Lugang (TW)

(73) Assignee: AUTOMOTIVE RESEARCH & TEST CENTER, Changhua County (TW)

( * ) Notice: Subject to any disclaimer, the term of this patent is extended or adjusted under 35 U.S.C. 154(b) by 200 days.

(21) Appl. No.: 13/711,441

(22) Filed: Dec. 11, 2012

(65) Prior Publication Data

US 2014/0055866 A1   Feb. 27, 2014

(30) Foreign Application Priority Data

Aug. 21, 2012   (TW) .............................. 101130271 A

(51) Int. Cl.
*G02B 27/14* (2006.01)
*G02B 27/01* (2006.01)
*G02B 5/04* (2006.01)

(52) U.S. Cl.
CPC .............. *G02B 27/0101* (2013.01); *G02B 5/04* (2013.01); *G02B 2027/015* (2013.01); *G02B 2027/0123* (2013.01)

(58) Field of Classification Search
CPC ................. G02B 2027/0123; G02B 2027/015; G02B 27/0101; G02B 5/04
USPC .......... 359/438, 636, 639–640, 629–633, 618
See application file for complete search history.

(56) References Cited

U.S. PATENT DOCUMENTS

| 3,712,707 | A * | 1/1973 | Henkes, Jr. ................... 359/448 |
| 7,508,356 | B2 | 3/2009 | Kanamori et al. | |
| 2004/0113818 | A1 * | 6/2004 | Yokokohji et al. ......... 340/995.1 |
| 2004/0246391 | A1 * | 12/2004 | Travis ............................... 349/6 |
| 2009/0066919 | A1 * | 3/2009 | Fujita et al. ...................... 353/98 |
| 2010/0246003 | A1 * | 9/2010 | Simmonds et al. ........... 359/567 |

* cited by examiner

*Primary Examiner* — Thomas K Pham
*Assistant Examiner* — Vipin Patel
(74) *Attorney, Agent, or Firm* — Muncy, Geissler, Olds & Lowe, P.C.

(57) ABSTRACT

An image-partitioned display device for virtual image is disclosed. The display device comprises an image display unit, a refractive element, and a virtual image generation module. The refractive element is disposed between the image display unit and the virtual image generation module. Firstly, the image display unit generates at least one image, and then the refractive element refracts and partitions the image into a plurality of sub-images. Finally, the virtual image generation module receives lights of the sub-images to generate a large area virtual image or a plurality of enlarged virtual images. A volume of the virtual image generation module is reduced and all kinds of display information are provided by the image-partitioned technology.

8 Claims, 9 Drawing Sheets

IMAGE-PARTITIONED DISPLAY DEVICE FOR VIRTUAL IMAGE

BACKGROUND OF THE INVENTION

1. Field of the Invention

The present invention relates to a display device, particularly to an image-partitioned display device for virtual image.

2. Description of the Related Art

It is well known that the Head Up Display (HUD) is an auxiliary aviation instrument that is first utilized in an aircraft, so that a pilot is able to look at the information on the panel without lowering his head, to avoid interruption of attention and lose Situation Awareness. The Head Up Display (HUD) can not only provide convenience in usage, but it can also raise the aviation safety. Therefore, it can be used in any types of the moving vehicles, such as aircrafts, or even automobiles and ships.

The prior arts or productions in existence mostly belong to a single optical path system, which displays information within a fixed range. The single optical path system has a small screen providing simple speed information, an arrowed guiding information, and vehicle information. In 2012, Audi proposes a model of a large area HUD in the Consumer Electronics Show (CES). The model uses three optical modules projecting three sets of images to provide different display information and satisfy different requirements. As the number of the optical module increases, the required space and cost will respectively enlarge and increase. Besides, the U.S. Pat. No. 7,508,356 uses reflection optical elements to partition images from a single image source. As a result, many optical devices with a large volume are required. In conclusion, in order to display multiple sets of images, the space and the cost that the HUD requires thereof cannot be effectively reduced without decreasing the number of the optical devices.

Accordingly, the present invention proposes an image-partitioned display device for virtual image to overcome the abovementioned problems.

SUMMARY OF THE INVENTION

The primary objective of the present invention is to provide an image-partitioned display device for virtual image, which uses a refractive element to partition an image to reduce the volume of a virtual image generation module and the cost, and provide different display information.

To achieve the abovementioned objectives, the present invention proposes an image-partitioned display device for virtual image, which comprises an image display unit generating at least one image; a refractive element refracting and partitioning said image into a plurality of sub-images; and a virtual image generation module receiving lights of the sub-images to generate a large area virtual image or a plurality of enlarged virtual images.

Below, the embodiments are described in detailed in cooperation with the attached drawings to make easily understood the technical contents, characteristics, and accomplishments of the present invention.

DETAILED DESCRIPTION OF THE INVENTION

Figure 1:
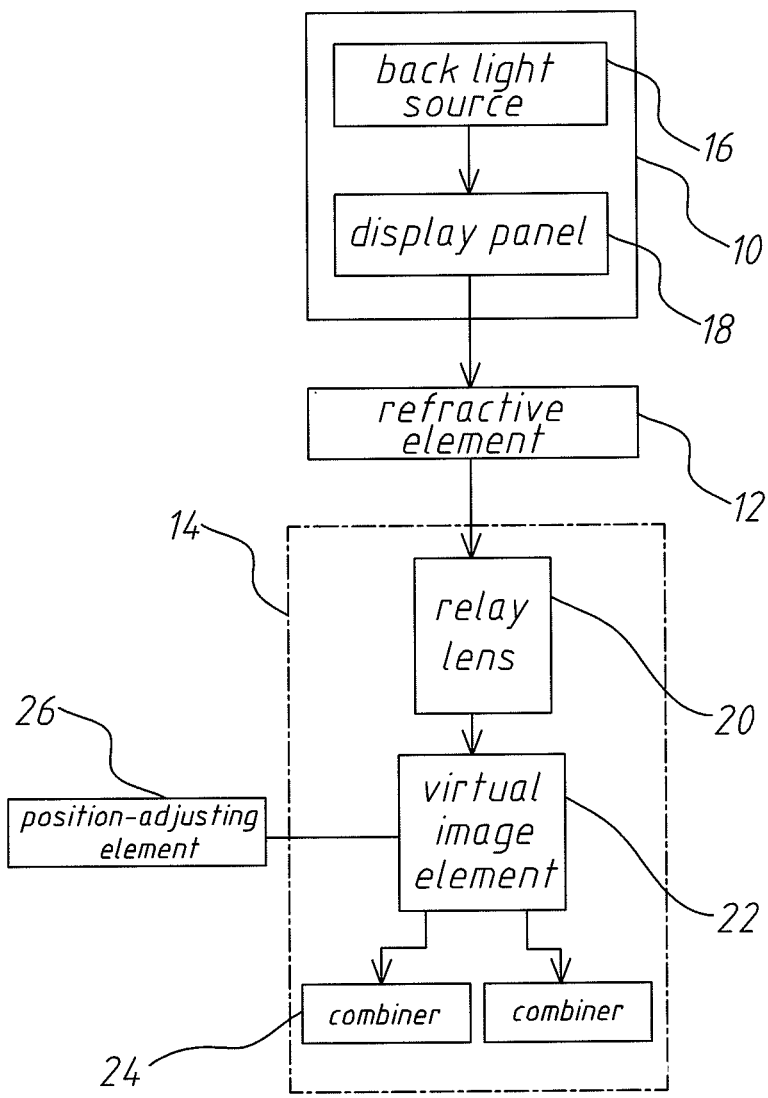
FIG. 1 is a block diagram schematically showing the architecture of an image-partitioned display device according to an embodiment of the present invention.
Figure 2:
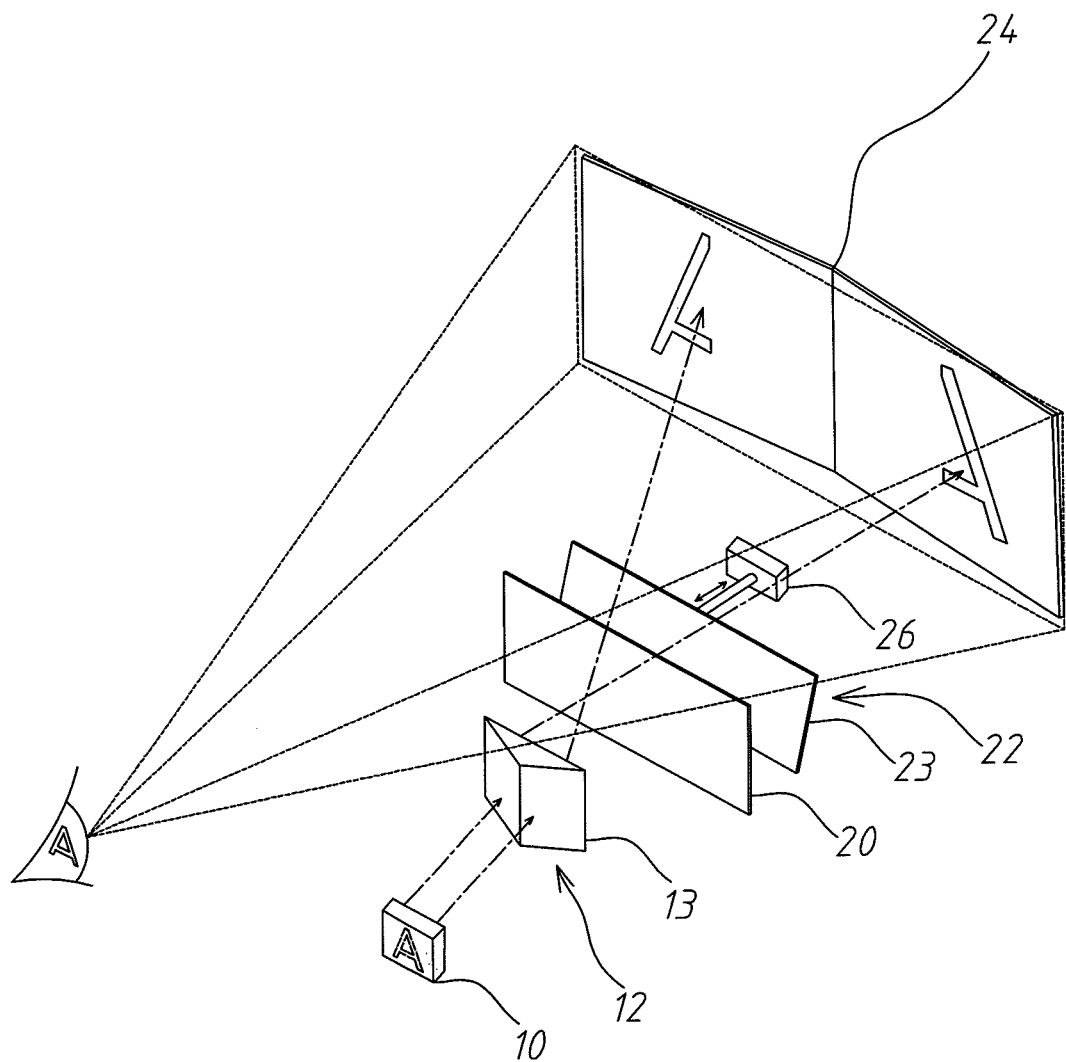
FIG. 2 is a perspective view schematically showing the image-partitioned display device according to an embodiment of the present invention.

The present invention can partition multiple sets of images. Below is the embodiment for partitioning two images, which can not limit the scope of the present invention. Refer to FIG. 1 and FIG. 2. The present invention comprises an image display unit 10 generating at least one image. The image comprises at least an external signal and at least a vehicle signal. The external signal may be an image or relate to a lane marking, a horizontal line, an obstacle contour, a distance to a front vehicle, or vehicle safety; and the vehicle signal relates to vehicle operation temperature, engine rotation speed, vehicle driving speed, guidance information, tire pressure, gear shift reminder, turning-around and back-up reminder, obstacle warning, flying attitude, flying speed, flying direction, vertical speed variations, vehicle inclination angle, wind direction, vehicle moving-forward or slow-down. The image is refracted by a refractive element 12 that can be a prism 13. The prism 13 is composed of two symmetrical right-angle prisms, which partition the image into a plurality of sub-images by the refraction principle. The refractive element 12 is disposed between the virtual image generation module 14 and the image display unit 10. The virtual image generation module 14 receives the lights of the sub-images to generate a large area virtual image or two enlarged virtual images, wherein the large area virtual image is combined by the two sub-images.

The image display unit 10 further comprises a back light source 16 and a display panel 18. The back light source 16 can be LEDs or a laser, and the display panel 18 can be a liquid crystal display (LCD), a liquid crystal on silicon (LCOS) display, or a cathode ray tube (CRT). The display panel 18 generates the image by the back light source 16. The virtual image generation module 14 further comprises a relay lens 20 receiving and relaying the lights of the sub-images, and then focusing the lights on within a focus point of a virtual image element 22. The virtual image element 22 reflects the lights of the sub-images relayed from the relay lens 20 to enlarge the sub-images. The virtual image element 22 can be a concave mirror or a convex lens. The virtual image element 22 is exemplified by a concave mirror 23 in the embodiment. In order to avoid the aberration, the relay lens 20 is a single lens or is composed of a plurality of lenses, and a mirror surface of the virtual image element 22 is an aspheric surface or a spherical surface, preferably the aspheric surface. The virtual image element 22 receives the lights of the sub-images relayed from the relay lens 20 to enlarge the sub-images and relay the enlarged sub-images to a plurality of combiners 24. The combiner 24 respectively reflects the enlarged sub-images to eyes and combines them into the large area virtual image or the enlarged virtual images. The numbers of the combiners 24 and the sub-images are equal. Each combiner 24 is a semi-transmitted mirror with a high reflectivity optical thin film, and the thin film has a transmission rate of between 70% and 75% and a reflection rate of between 25% and 30%. The virtual image element 22 is disposed on a position-adjusting element 26, which adjusts the displacement or angle of the virtual image element 22. The position-adjusting element 26 can be a screw, a gear, or a mechanism able to move the virtual image element 22.

Figure 3:
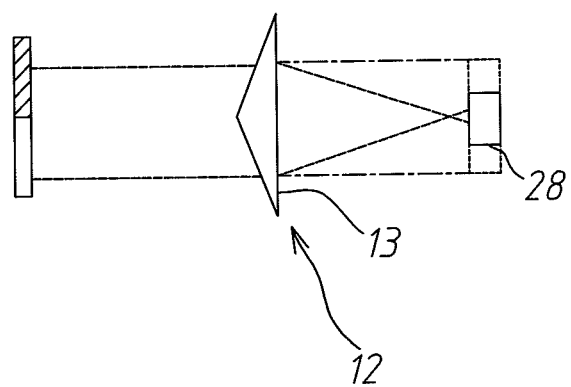
FIG. 3 is a diagram schematically showing a prism reducing a volume of a virtual image generation module according to an embodiment of the present invention.

FIG. 2 and FIG. 3 show a path of the light emitted by the image display unit 10 and refracted by the refractive element 12, and the relay lens 20 and the concave mirror 23 are integrated in a virtual image magnifying module 28. From the figure, compared to the unrefracted light, the virtual image magnifying module 28 with a smaller volume can use the refracted light to form an image. In other words, the present invention uses the refractive element 12 to refract the light and partition the image, so that the volume and the cost of the virtual image generation module are reduced.

Refer to FIG. 1 and FIG. 2. Firstly, the display panel 18 uses the back light source 16 to generate at least one image. The refractive element 12 refracts the image into a plurality of sub-images. Then, the relay lens 20 relays the light of the sub-images and focuses them on within the focus point of the concave mirror 23 and not outside the focus point, whereby the concave mirror 23 reflects the light to enlarge the sub-images. The combiners 24 respectively reflect the enlarged sub-images to eyes and combine them into the large area virtual image or the enlarged virtual images after respectively receiving the sub-images.

The position-adjusting element 26 can adjust the distance between the concave mirror 23 and the relay lens 20. A position of the projected image depends on the displacement and angle of the concave mirror 23. And, the limit for the adjusted displacement and angle is affected by the curvature of the concave mirror 23 and the angle of the prism 13. As a result, the abovementioned factor has to be considered.

Figure 4:
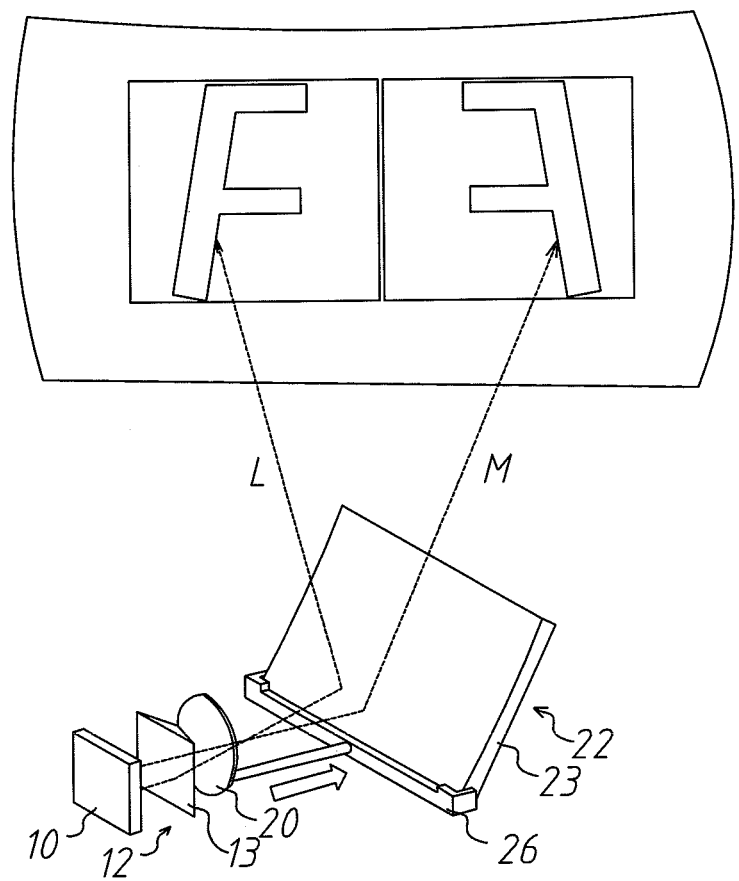
FIG. 4 is a diagram schematically showing a large-curvature concave mirror at a short distance from a relay lens according to an embodiment of the present invention.
Figure 5:
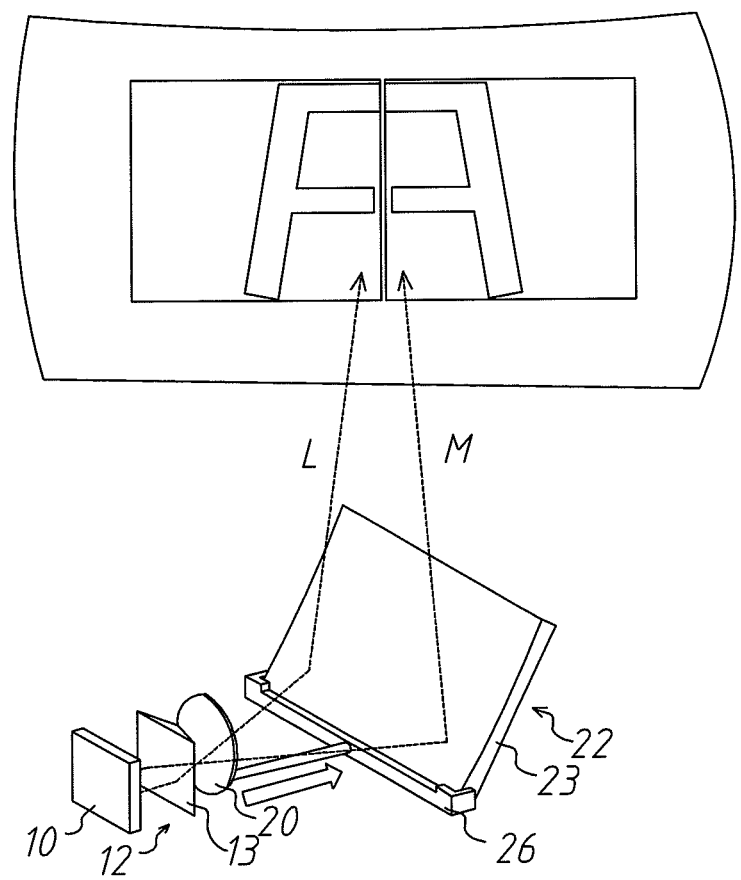
FIG. 5 is a diagram schematically showing a large-curvature concave mirror at a long distance from the relay lens according to an embodiment of the present invention.

As shown in FIG. 4, when the concave mirror 23 is a large-curvature element and the distance between the concave mirror 23 and the relay lens 20 is shorter, the light rays L and M emit to the center of the concave mirror 23, and the reflection angles of the light rays L and M are smaller. Thus, the light rays L and M form the images on the combiners 24, which are split more distantly. On the contrary, as shown in FIG. 5, the distance between the concave mirror 23 and the relay lens 20 is longer, the light rays L and M emit to the edge of the concave mirror 23, and the reflection angles of the light rays L and M are larger. Thus, the light rays L and M form the images on the combiners 24, which are split more closely, and a large-area virtual image may be formed.

Figure 6:
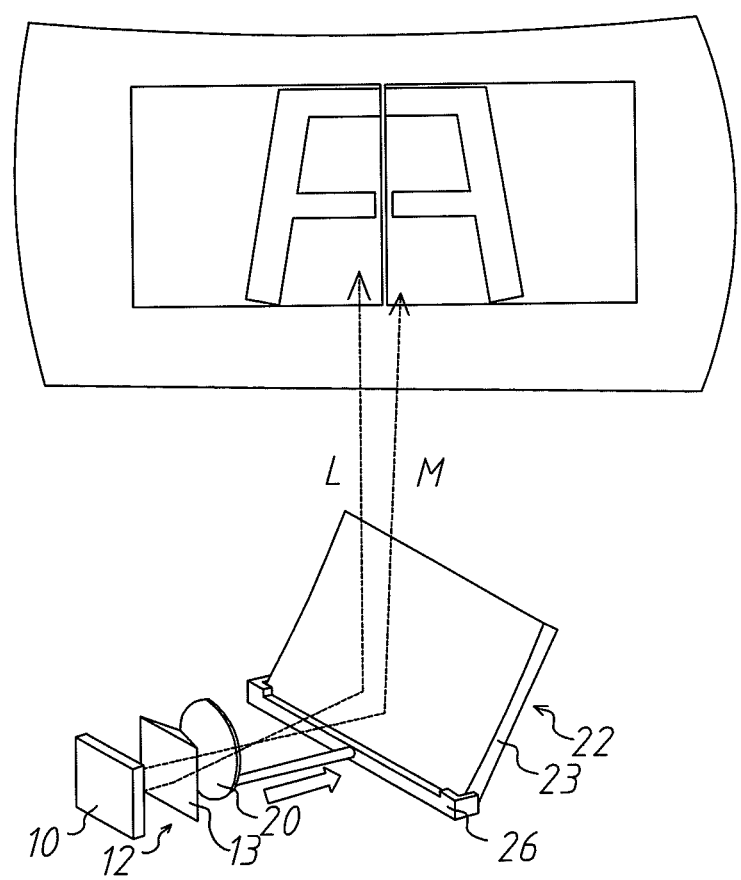
FIG. 6 is a diagram schematically showing a small-curvature concave mirror at a short distance from the relay lens according to an embodiment of the present invention.

As shown in FIG. 6, when the concave mirror 23 is a small-curvature or curvature-free element, the light rays L and M emit to the center and the edge of the concave mirror 23, and the reflection angles of the light rays L and M are almost not changed. As a result, the distance between the concave mirror 23 and the relay lens 20 is shorter, the enlarged virtual images are split more closely.

Figure 7:
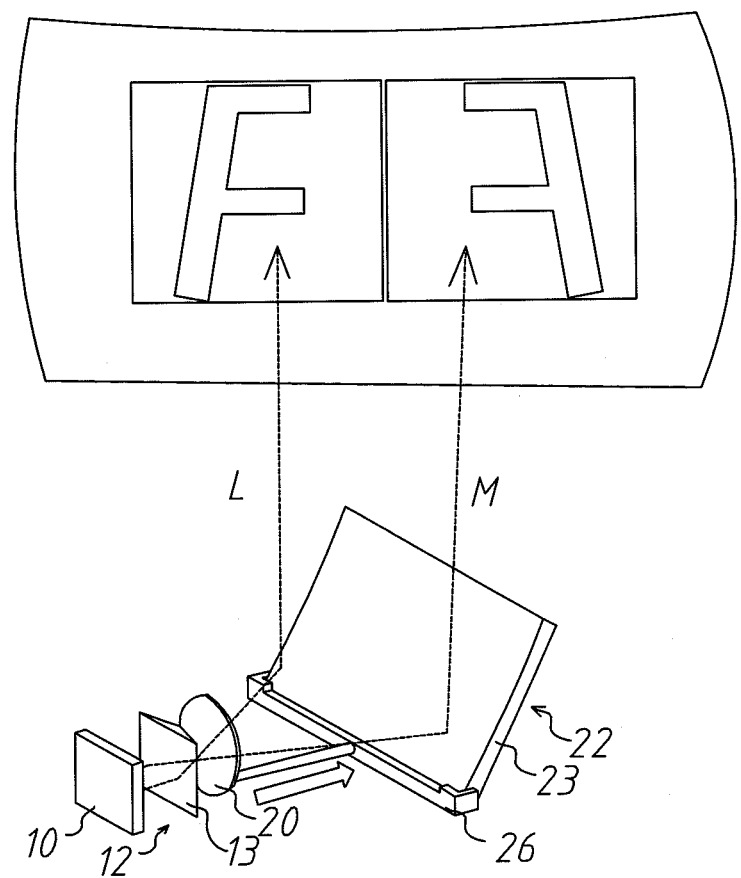
FIG. 7 is a diagram schematically showing a small-curvature concave mirror at a long distance from the relay lens according to an embodiment of the present invention.

As shown in FIG. 7, the distance between the concave mirror 23 and the relay lens 20 is longer, the enlarged virtual images are split more distantly.

Figure 8:
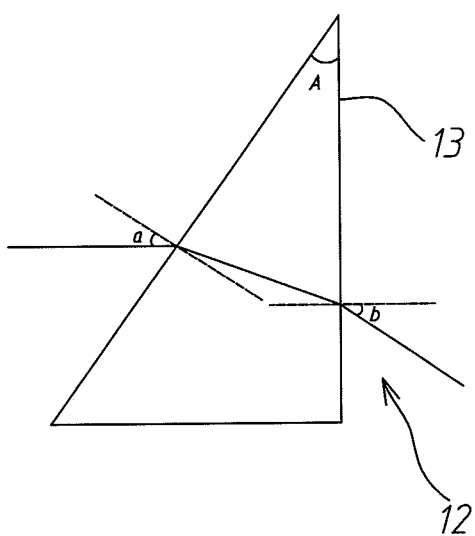
FIG. 8 is a diagram schematically showing refracted optical paths of the prism according to an embodiment of the present invention.
Figure 9:
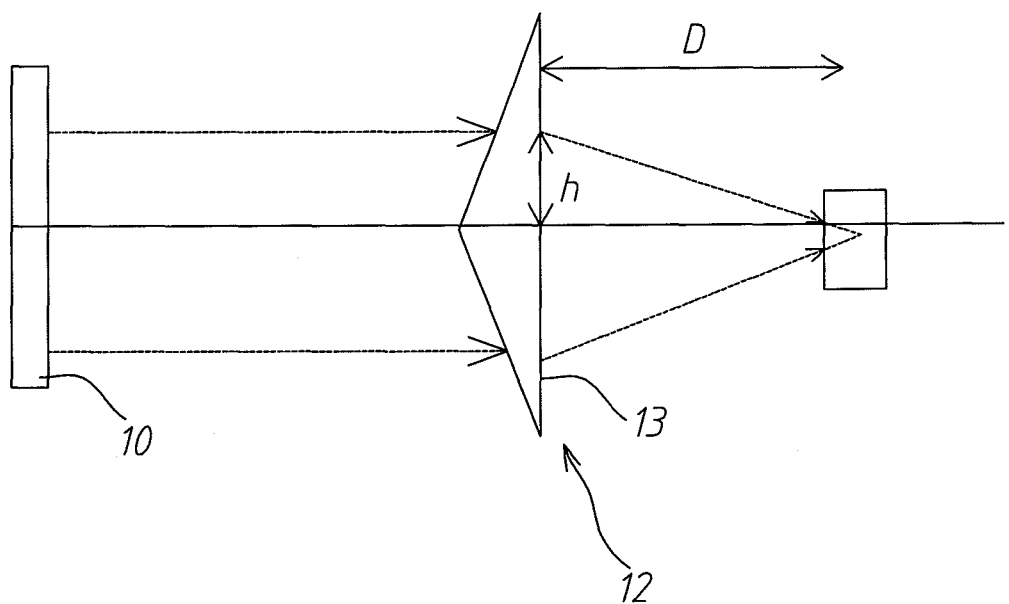
FIG. 9 is a diagram schematically showing a distance between a position where two light beams intersect and the prism.

Refer to FIG. 8 and FIG. 9, an included angle and positions of the two sub-images depend on the refractive index n and an apex angle A of the prism 13. After adjusting the angle, the volume of the virtual image generation module can be effectively reduced. After the light passes through the prism 13, the exit angle b is described as the formula (1), wherein a is an inclined angle.

$$b = \sin^{-1}(\sin A \sqrt{n^2 - \sin^2 A} - \cos A \sin A) \quad (1)$$

The distance D between the position that the light rays intersect and the prism 13 is described as the formula (2), wherein h is the distance between the exit light ray and the center of the prism 13, and b is the exit angle.

$$D = h/\tan(b) \quad (2)$$

Refer to FIG. 1, FIG. 2 and FIG. 9. Suppose that the apex angle A is 15 degrees, and that the prism 13 is made of BK7. When the light rays emit to the prism 13, the light rays exit at ±14.868 degrees by the prism 13. The position that the light rays focus on is 95.8 mm from the display panel 18 and is disposed at the right side of the display panel 18. The concave mirror 23 is disposed at the position to reduce its volume. Compared with the single light path system of the traditional Head Up Display (HUD), the volume of the concave mirror 23 of the present invention is reduced by about 53.8%.

In conclusion, the present invention not only provides different image information but also reduces the volume of back-end optical module.

The embodiments described above are only to exemplify the present invention but not to limit the scope of the present invention. Therefore, any equivalent modification or variation according to the shapes, structures, characteristics and spirit of the present invention is to be also included within the scope of the present invention.

What is claimed is:

1. An image-partitioned display device for virtual image comprising:
    an image display unit generating at least one image;
    a refractive element refracting and partitioning said image into a plurality of sub-images; and
    a virtual image generation module receiving lights of said sub-images to generate a large area image or a plurality of enlarged images, and said virtual image generation module further comprises:
    a relay lens receiving and relaying said lights of said sub-images, and then focusing said lights on within a focus point of a concave mirror, and said concave mirror reflects said lights of said sub-images relayed from said relay lens to enlarge said sub-images; and
    a plurality of combiners respectively receiving enlarged said sub-images from said concave mirror, and then reflecting and combining them into said large area image or said enlarged images, and each said combiner is a semi-transmitted mirror with a high reflectivity optical thin film, and said thin film has a transmission rate of between 70% and 75% and a reflection rate of between 25% and 30%, and a number of said combiners is equal to that of said sub-images.

2. The image-partitioned display device for virtual image according to claim 1, wherein said image display unit further comprises:
    a back light source; and
    a display panel generating said at least one image by said back light source.

3. The image-partitioned display device for virtual image according to claim 2, wherein said display panel is a liquid crystal display (LCD), a liquid crystal on silicon (LCOS) display, or a cathode ray tube (CRT).

4. The image-partitioned display device for virtual image according to claim 1, further comprising a position-adjusting element, and said concave mirror is disposed on said position-adjusting element, which adjusts displacement or an angle of said concave mirror.

5. The image-partitioned display device for virtual image according to claim 1, wherein a mirror surface of said concave mirror is an aspheric surface or a spherical surface.

6. The image-partitioned display device for virtual image according to claim 1, wherein said relay lens is a single lens or is composed of a plurality of lenses.

7. The image-partitioned display device for virtual image according to claim 1, wherein spaces that said enlarged images are split depend on curvature of said concave mirror and a distance between said concave mirror.

8. The image-partitioned display device for virtual image according to claim 1, wherein said image comprises an external signal and a vehicle signal, and said external signal relates to a lane marking, a horizontal line, an obstacle contour, or a distance to a front vehicle; and said vehicle signal relates to vehicle operation temperature, engine rotation speed, vehicle driving speed, guidance information, tire pressure, gear shift reminder, turning-around and back-up reminder, obstacle warning, flying attitude, flying speed, flying direction, vertical speed variations, vehicle inclination angle, wind direction, vehicle moving-forward or slow-down.

* * * * *